Figure 1:
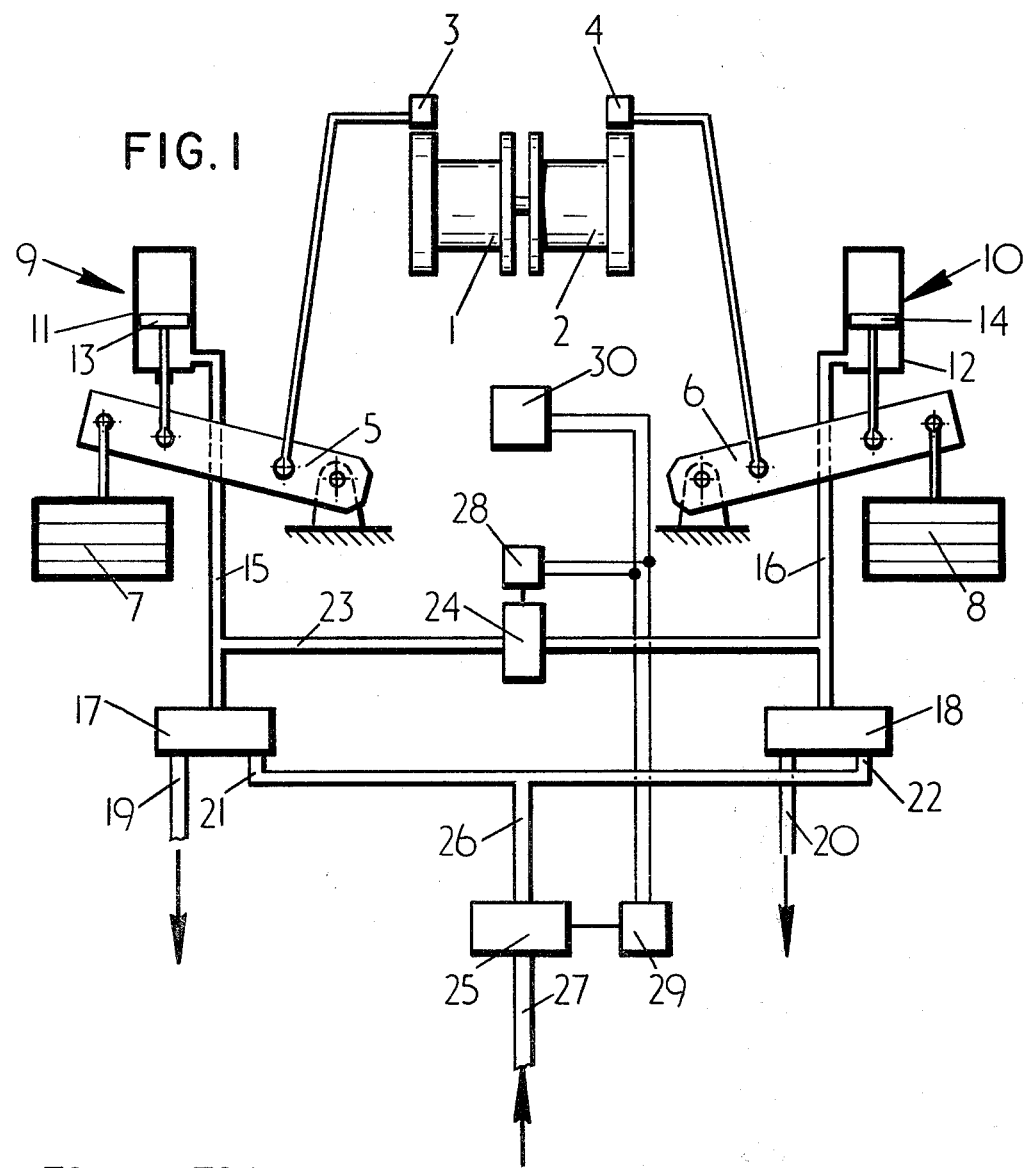

United States Patent
Shaw

[11] 3,982,728
[45] Sept. 28, 1976

[54] BRAKING APPARATUS FOR HOISTS

[75] Inventor: Bernard Elliott Shaw, Paisley, Scotland

[73] Assignee: Fullerton, Hodgart & Barclay Limited, Scotland

[22] Filed: June 10, 1974

[21] Appl. No.: 478,103

[52] U.S. Cl. .................... 254/184; 188/170
[51] Int. Cl.² ........................................ B66D 1/26
[58] Field of Search ........ 254/183, 184, 185, 150 R; 188/105, 170, 174, 151 A; 303/6 R; 192/3 R

[56] References Cited
UNITED STATES PATENTS

| | | | |
|---|---|---|---|
| 2,677,442 | 5/1954 | Bell et al. | 188/105 |
| 2,882,098 | 4/1959 | Newcomb | 188/151 A |
| 3,090,651 | 5/1963 | Clarke | 188/105 |
| 3,268,211 | 8/1966 | Schlechter et al. | 254/185 |
| 3,276,551 | 8/1966 | Buletti et al. | 188/170 |
| 3,291,451 | 12/1966 | Trollope | 254/185 |
| 3,463,276 | 8/1969 | Brooks, Jr. | 188/170 |
| 3,643,922 | 2/1972 | Linde | 254/184 |

*Primary Examiner*—L. J. Paperner
*Assistant Examiner*—Kenneth Noland
*Attorney, Agent, or Firm*—Larson, Taylor and Hinds

[57] ABSTRACT

A braking mechanism for a hoist incorporating two winding drums with brakes biased to move to the brakes applied state and fluid pressure means controllable by valves to operate in opposition to the biasing means has a bridge pipe containing a stop valve interconnecting the individual fluid supply lines leading from the control valves to the fluid pressure means. It also has isolator stop valve means arranged to control the flow of operating fluid to the control valves. The stop valve in the bridge pipe and the isolator stop valve may be arranged for remote control and may be biased so that the stop valve in the bridge pipe tends to open and the isolator stop valve tends to close.

4 Claims, 2 Drawing Figures

U.S. Patent   Sept. 28, 1976   3,982,728

BRAKING APPARATUS FOR HOISTS

This invention relates to a braking mechanism for a hoist e.g. a mine hoist of the type having two hoisting cables wound around interconnected drums and a brake system incorporating a brake for each drum, biasing means urging the brakes to the brakes applied state and fluid pressure thruster means operable in opposition to the biasing means to move the brakes to the "off" state.

In such a braking mechanism there is provided for each brake a thruster means usually constituted by a cylinder containing a piston connected to the brake and a fluid supply line for the thruster means containing a two-way brake-control valve operative to connect the thruster means alternatively to an exhaust opening or to a source of supply of operating fluid under pressure.

In such a mine hoist installation it sometimes happens that the brake control gear for one of the brakes fails. Such failure which may be caused by jamming of the mechanism or sticking of a brake control valve can have as its result that one brake control valve remains permanently in one setting. If the setting is that in which the associated operating cylinder is in communication with the exhaust opening the brake associated with that valve will remain permanently applied because the pressure in the operating cylinder will be zero and the biasing mechanism will act to apply the brake. While this situation is serious from an operative point of view it does not present any safety hazard. If, however, a brake control valve should remain permanently in the position in which the associated cylinder is connected to the supply of operating fluid under pressure this brake will remain permanently off.

It is an object of the present invention to provide a braking system in which either valve can be used in an emergency to control both brakes.

A braking mechanism for a hoist according to the invention incorporates two interconnected drums, two hoisting cables wound around said drums, a brake system incorporating a brake for each drum and biasing means urging the brakes to move to the brakes applied state and fluid pressure thruster means operable in opposition to the biasing means to move the brakes to the off state, a two-way brake control valve for each thruster means, a fluid supply line for each thruster means connected between the associated thruster means and the associated two-way brake control valve, said valve being operable to connect the associated fluid supply line alternatively to an exhaust branch or to a fluid-receiving branch, a bridge pipe interconnecting the fluid supply lines leading to the two fluid pressure thruster means, a stop valve located in the bridge pipe and isolator stop valve means the outlet of which is connected to the fluid-receiving branches of the two-way brake control valves and the inlet of which is connectible to a source of supply of operating fluid under pressure.

The isolator stop valve means may be constituted by two separate stop valves one for each brake control valve. Alternatively one isolator stop valve may be provided, the outlet being connected by branch pipes to the fluid-receiving branches of both brake control valves.

The stop valve in the bridge pipe and the isolator stop valve means may be arranged to be mechanically operated and may be ganged in such a way that when one stop valve is open the other is closed.

The stop valve in the bridge pipe and the isolator stop valve means may be arranged to be operated electrically by remote control in which case the stop valve in the bridge pipe is preferably arranged to be open when unenergized and the isolator stop valve is normally closed when unenergized.

Figure 2:
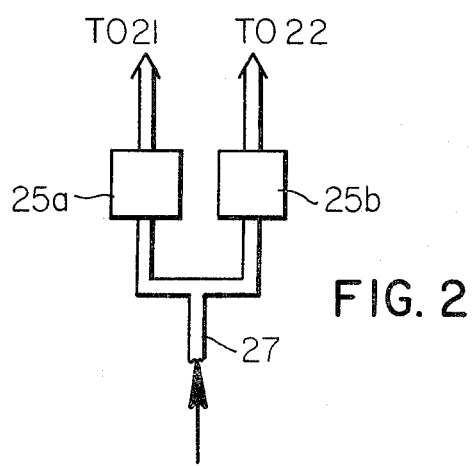

FIG. 1 is a diagrammatic representation, partially in block form, of a preferred embodiment of the system of the invention; and FIG. 2 is a detail of FIG. 1, illustrating an alternative embodiment of the isolator stop valve.

A practical embodiment of the invention is illustrated diagrammatically in the accompanying drawings in which 1 and 2 denote interconnected winding drums each arranged to receive a hoisting cable, 3 and 4 denote brakes associated with the drums 1 and 2 respectively, the brakes 3 and 4 being connected by way of levers 5 and 6 to respective biasing means constituted by weights 7 and 8 arranged to urge the brakes 3 and 4 to move to the brakes-applied state. 9 and 10 denote thruster means constituted by cylinders 11 and 12 containing pistons 13 and 14 connected to the respective levers 5 and 6 in such a manner that when fluid under pressure is admitted by way of fluid supply lines 15 and 16 to the cylinders 11 and 12 the thruster means 9 and 10 operate in opposition to the weights 7 and 8 to move the brakes 3 and 4 to the brakes-off state. 17 and 18 denote two-way brake control valves one for each thruster means 9 and 10, the brake control valves 17 and 18 having exhaust branches 19 and 20 and fluid-receiving branches 21 and 22. 23 denotes a bridge pipe interconnecting the fluid supply lines 15 and 16 and 24 denotes a stop valve intercalated in the bridge pipe 23. 25 denotes an isolator stop valve the outlet 26 of which is connected to the fluid-receiving branches 21 and 22 of the brake control valves 17 and 18 and the inlet 27 of which is connectible to a source of supply of operating fluid under pressure. The stop valve 24 in the bridge pipe 23 and the isolator stop valve 25 are arranged to be operated by electrical mechanism 28 and 29 from a remote control position 30, the stop valve 24 being arranged to be open when unenergized and the isolator stop valve 25 being arranged to be closed when unenergized.

In practice, if one brake control valve for example the valve 17 should for any reason remain permanently in the position in which the associated cylinder 11 is connected to the source of supply of fluid under pressure which would normally result in the associated brake 3 being held "off" the emergency action to be taken is to close the isolator stop valve 25 controlling the supply of fluid under pressure to the control valve 17 and to open the stop valve 24 in the bridge pipe 23. Operation of the other brake control valve 18 which is operating normally will thus cause the escape of fluid from both brake cylinders 11 and 12 through the exhaust opening 20 of the valve 18 which is operative, the fluid from the cylinder 11 associated with the failed valve 17 reaching the operative valve 18 through the bridge pipe 23 and the open stop valve 24 therein. Additional operating fluid cannot reach the cylinder 11 associated with the failed valve 17 even although this valve remains open because the isolator stop valve 25 controlling the supply of fluid under pressure is closed. Both brakes 3 and 4 are thus applied under the control of the one control valve 18 although the rate of application may be reduced because one valve is handling the fluid from both cylinders. Where as illustrated the stop valve 24 in the bridge pipe 23 and the isolator valve 25 are electrically remote controlled from the position 30 and are arranged to be open and closed respectively when unenergized the system has a fail-safe characteristic in that failure of the electric current operating these valves will automatically put the system into the condition where it is capable of being operated by either brake control valve.

In a situation where one drum 1 or 2 is held by its own brake 3 or 4 and the clutch normally connecting the drums is disconnected allowing the other drum 2 or 1 to be moved on its own, and if the valve or control system should fail on the brake associated with that drum the system of the invention is still operative to exhaust the cylinder 12 or 11 and apply the brake safely.

As illustrated in FIG. 2, the isolator stop valve of FIG. 1 may comprise two separate stop valves 25a and 25b, one for each brake control valve.

What is claimed is:

1. In a braking mechanism for a hoist incorporating two interconnected drums, two hoisting cables wound around said drums, a brake system incorporating a brake for each drum and biasing means urging the brakes to move to the brakes applied states and fluid pressure thruster means operable in opposition to the biasing means to move the brakes to the off state, first and second two-way brake control valves for respective thruster means each of said valves having a fluid receiving branch and two alternately selectable outlet branches, and a fluid supply line for each thruster means connected between the associated thruster means and outlet branch of the associated two-way brake control valve, said valve being operable to connect the associated fluid supply line alternatively to the other outlet branch which constitutes an exhaust branch or to the fluid-receiving branch, the improvement comprising a bridge pipe interconnecting the fluid supply lines leading to the two fluid pressure thruster means at points in said fluid supply lines between said two-way valves and said thruster means, a stop valve located in the bridge pipe and isolator stop valve means the outlet of which is connected to the fluid-receiving branches of the two-way brake control valves and the inlet of which is connectible to a source of supply of operating fluid under pressure.

2. A braking mechanism as claimed in claim 1 in which the isolator stop valve means is constituted by two separate stop valves one for each brake control valve.

3. A braking mechanism as claimed in claim 1 in which the isolator stop valve means is constituted by a single stop valve, the outlet being connected by branch pipes to the fluid-receiving branches of both brake control valves.

4. A braking mechanism as claimed in claim 1 in which the stop valve in the bridge pipe and the isolator stop valve means are arranged to be operated electrically by remote control and the stop valve in the bridge pipe is arranged to be open when unenergized and the isolator stop valve is closed when unenergized.

* * * * *